US012487375B2

(12) United States Patent
Amatucci et al.

(10) Patent No.: US 12,487,375 B2
(45) Date of Patent: Dec. 2, 2025

(54) ORBITAL DEBRIS DETECTION SYSTEM USING CURRENT PULSE TRANSFORMER

(71) Applicant: The Government of the United States of America, as represented by the Secretary of the Navy, Arlington, VA (US)

(72) Inventors: William E. Amatucci, Fairfax, VA (US); Gurudas I. Ganguli, Arlington, VA (US); Abhijit Sen, Ahmedabad (IN); Christopher Crabtree, Springfield, VA (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 331 days.

(21) Appl. No.: 18/178,036

(22) Filed: Mar. 3, 2023

(65) Prior Publication Data
US 2024/0094425 A1    Mar. 21, 2024

Related U.S. Application Data

(60) Provisional application No. 63/318,807, filed on Mar. 11, 2022.

(51) Int. Cl.
*G01V 3/10* (2006.01)
*H01F 27/24* (2006.01)
*H01F 27/30* (2006.01)

(52) U.S. Cl.
CPC .............. *G01V 3/10* (2013.01); *H01F 27/24* (2013.01); *H01F 27/306* (2013.01)

(58) Field of Classification Search
CPC ....... G01V 3/08; G01R 15/183; G01R 15/186
See application file for complete search history.

(56) References Cited

U.S. PATENT DOCUMENTS

2014/0375403 A1\* 12/2014 Rowe ..................... H01F 3/08
427/127
2018/0284161 A1\* 10/2018 Shinagawa .......... G01R 15/186

FOREIGN PATENT DOCUMENTS

KR     20110026718 A  *  3/2011    ........... G01N 23/046

OTHER PUBLICATIONS

National Research Council. 2011. Limiting Future Collision Risk to Spacecraft: An Assessment of NASA's Meteoroid and Orbital Debris Programs. Washington, DC: The National Academies Press. https://doi.org/10.17226/13244.
(Continued)

*Primary Examiner* — Noam Reisner
(74) *Attorney, Agent, or Firm* — US Naval Research Laboratory; Suresh Koshy

(57) ABSTRACT

A detector for detecting optically undetectable sub-cm orbital debris. A ring detector comprising a current pulse transformer (CPT) in which a conducting wire coil is wrapped around a loop of high permeability material having a magnetic nanoparticle (MNP) core. Debris objects in low earth orbit become charged as they pass through local plasma. As each charged debris object passes through the coil-wrapped loop, its current generates an induced voltage pulse, which can be used to detect the presence of the debris object. By fielding such a detector on a satellite, a long duration survey of the debris distribution in the LEO region can be made as the satellite's altitude is systematically varied.

4 Claims, 6 Drawing Sheets

(56) References Cited

OTHER PUBLICATIONS

J.-C. Liou, "An active debris removal parametric study for LEO environment remediation," Advances in Space Research 47 (2011) 1865-1876.
A. Sen et al., Nonlinear wave excitations by orbiting charged space debris objects. Advances in Space Research, 56 (3):429-435, Aug. 2015.
S. Jaiswal et al., Experimental observation of precursor solitons in a flowing complex plasma, Phys Rev E., 93, 041201(R), 2016.
A. Sen et al., "Electromagnetic pinned solitons for space debris detection," Phys Plasmas, 30, 012301 (2023), https://doi.org/10.1063/5.0099201.
A. Sen et al., Stimulated forewake excitations from moving charged objects in the ionosphere, Paper 189 at the 2019 International Conference on Electromagnetics in Advanced Applications (ICEAA), Granada, Spain.
A. Sen et al., Precursor Magnetosonic Solitons from Moving Charged Objects in the Ionosphere, Paper 214 at the 2021 International Conference on Electromagnetics in Advanced Applications (ICEAA), Honolulu, Hawaii, U.S.A.
W. E. Amatucci, et al., "Plasma Response to Strongly Sheared Flow," Phys. Rev. Lett. 77, 1978 (1996).
W. E. Amatucci et al., "Velocity-shear-driven ion-cyclotron waves and associated transverse ion heating," J. Geophys. Res., 103( A6), 11711- 11724, doi:10.1029/98JA00659.

\* cited by examiner

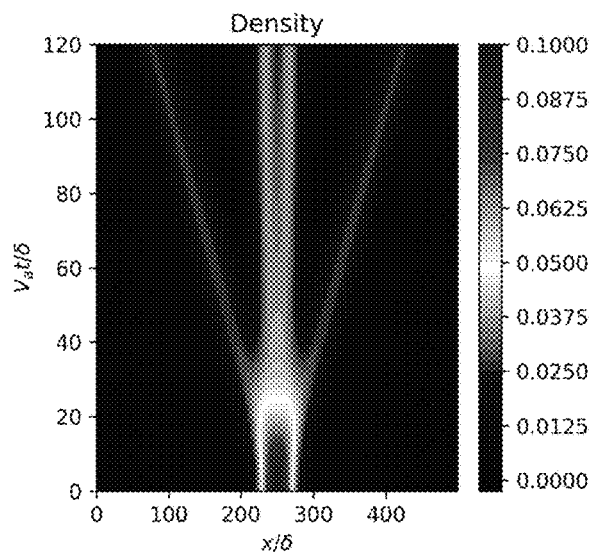
*FIG. 2A*
*FIG. 2B*
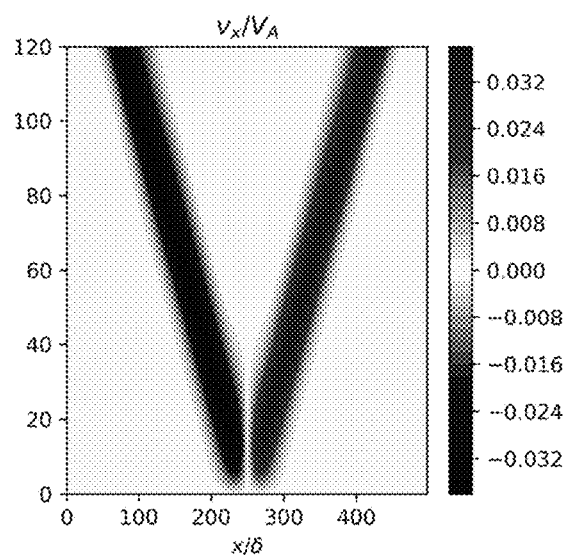
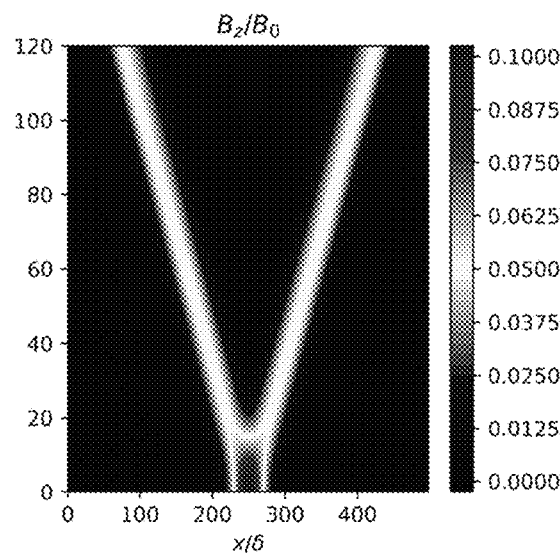
*FIG. 2C*

ORBITAL DEBRIS DETECTION SYSTEM USING CURRENT PULSE TRANSFORMER

CROSS-REFERENCE

This Application is a Nonprovisional of and claims the benefit of priority under 35 U.S.C. § 119 based on U.S. Provisional Patent Application No. 63/318,807 filed on Mar. 11, 2022. The Provisional Application and all references cited herein are hereby incorporated by reference into the present disclosure in their entirety.

FEDERALLY-SPONSORED RESEARCH AND DEVELOPMENT

The United States Government has ownership rights in this invention. Licensing inquiries may be directed to Office of Technology Transfer, US Naval Research Laboratory, Code 1004, Washington, DC 20375, USA; +1.202.767.7230; techtran@nrl.navy.mil, referencing Navy Case #210991.

TECHNICAL FIELD

The present invention relates to detection and characterization of the size, shape, and distribution of orbital debris in the Low Earth Orbit (LEO) environment.

BACKGROUND

Half a century of human exploitation of the near-earth space environment has resulted in an exponential growth in orbital debris, which is now threatening assured continuous access to space. Serious malfunction or disabling of critical on-orbit satellite systems or sensors can result from a collision with a debris fragment traveling at hypervelocity speeds.

The plot in FIG. 1 shows the relative abundance of debris fragments as a function of their dimension as of the year 1995. As can be seen from the plot, there was then a large population of smaller sub-cm scale debris. The smaller the scale size, the larger the abundance of such particles and hence the greater the probability of their collisions with satellites or other orbital objects. Although collision with sub-mm scale debris particles may be benign, NASA has deemed that collision with mm size or larger debris at orbital speeds could be mission ending. While debris that is larger than 1 cm can be optically detected, it is challenging to do so for the sub-cm scale debris. Given the number of satellites and other spacecraft in orbit since 1995, there is every reason to believe that the number of sub-cm debris particles has substantially increased since the 1995 study was done and is continuing to increase, making collisions with such small particles ever more likely.

Consequently, accurate tracking of the characteristics and distribution of small debris as a function of the altitude is necessary for implementation of collision avoidance maneuvers and choice of satellite orbits in order to protect critical space assets. This is underscored in a recent study by the National Research Council. See National Research Council. 2011. *Limiting Future Collision Risk to Spacecraft: An Assessment of NASA's Meteoroid and Orbital Debris Programs.* Washington, DC: The National Academies Press. https://doi.org/10.17226/13244. Optical tracking of the small sub-centimeter size debris is difficult at best, but according to NASA, a collision with even a millimeter-size debris at orbital speed is mission ending. See J.-C. Liou, Paper 2011-r-32, 28th International Symposium on Space Technology and Science, Okinawa, Japan, Jun. 5-12, 2011. Therefore, innovative detection techniques are needed for accurate tracking of the debris distribution and timely implementation of collision avoidance maneuvers to protect satellites.

An object, such as a piece of debris, that is immersed in a plasma, will acquire a net electrical charge due to the relative difference in mobility between the heavy plasma ions and the much lighter electrons. Photoemission from debris objects exposed to direct sunlight also contributes to the net particle charge. Consequently, charged debris objects moving at supersonic orbital speeds form a current pulse flowing through the background plasma. In an Air Force Global sponsored collaborative program with the Institute for Plasma Research (IPR), the Naval Research Laboratory (NRL) has shown a charged object moving with supersonic speed through a plasma generates nonlinear fore-wake excitations known as solitons that could be detected in advance of the arrival of the object. Even though a micro projectile is optically undetectable, the density irregularity due to the nonlinear signature of its interaction with the ambient plasma could be readily detected by in situ or ground-based methods.

Generation of these solitons in realistic LEO plasma conditions has recently been assessed and found to be viable. See A. S. Truitt et al., Simulating plasma solitons from orbital debris using the forced Korteweg-de Vries equation. *Journal of Spacecraft and Rockets,* 57(5), 876-897, 2020. Calculations indicate that the solitons are either pinned to the debris or radiate from it and the plasma density irregularities they create are detectable. See A. Sen et al., Nonlinear wave excitations by orbiting charged space debris objects. *Advances in Space Research,* 56(3):429-435, August 2015 ("Sen 2015"). A laboratory experiment at the Institute for Plasma Research (IPR) demonstrated the generation and radiation of such solitons. See S. Jaiswal et al., Experimental observation of precursor solitons in a flowing complex plasma, *Phys Rev E.,* 93, 041201(R), 2016. The current pulse formed by the charged orbital debris motion presents opportunity for debris detection.

The seminal work that discovered the formation of ion acoustic solitons was in the electrostatic regime. See Sen 2015, supra. Recently, this concept has been generalized to the electromagnetic regime to demonstrate that magnetosonic solitons can be realized from similar interaction of a speeding charged particle through the ambient plasma, as shown in FIGS. 2A-2C, which show the results of preliminary modeled calculations of showing generation and propagation of two magnetosonic solitons, in which space (normalized to skin depth) is on the horizontal axis and time is on the vertical axis (normalized with skin depth and Alfven velocity), where FIG. 2A shows plasma density perturbation normalized to the background value, FIG. 2B shows a calculation of the z-component of the magnetic perturbation of the solitons normalized to the background magnetic field, and FIG. 2C shows the x component normalized to the Alfven velocity. See A. Sen et al., "Electromagnetic pinned solitons for space debris detection," *Phys Plasmas,* 30, 012301 (2023), https://doi.org/10.1063/5.0099201; A. Sen et al., Stimulated fore-wake excitations from moving charged objects in the ionosphere, Paper 189 at the 2019 International Conference on Electromagnetics in Advanced Applications (ICEAA), Granada, Spain; and A. Sen et al., Precursor Magnetosonic Solitons from Moving Charged Objects in the Ionosphere, Paper 214 at the 2021 International Conference on Electromagnetics in Advanced Applications (ICEAA), Honolulu, Hawaii, U.S.A.

The Naval Research Laboratory is also investigating methods for the remote detection of orbital debris-generated solitons. The current pulse transformer described in this patent application has been conceived in order to directly detect small-scale charged orbital debris from the current it produces. This direct in situ detection technique can then be used to subsequently associate the debris object with generated solitons that can be independently detected with collocated plasma wave receiving antennas.

SUMMARY

This summary is intended to introduce, in simplified form, a selection of concepts that are further described in the Detailed Description. This summary is not intended to identify key or essential features of the claimed subject matter, nor is it intended to be used as an aid in determining the scope of the claimed subject matter. Instead, it is merely presented as a brief overview of the subject matter described and claimed herein.

The apparatus and method of the present invention provide a means for the direct in situ detection and cataloging of distribution of orbital debris, setting the stage for development and benchmarking of a new remote sensing technique for detection of optically undetectable, sub-centimeter, orbital debris.

In accordance with the present invention, a ring detector comprising a current pulse transformer (CPT) in which a conducting wire coil is wrapped around a loop of high permeability material having a magnetic nanoparticle (MNP) core. Debris objects in low earth orbit become charged as they pass through local plasma. As each charged debris object passes through the coil-wrapped loop, its time-varying current generates an induced voltage pulse, which can be used to detect the presence of the debris object. By fielding such a detector on a satellite, a long duration survey of the debris distribution in the LEO region can be made as the satellite's altitude is systematically varied.

BRIEF DESCRIPTION OF THE DRAWINGS

FIGS. 2A-2C are plots illustrating the results of normalized Maxwell equation calculations for generation and propagation of two magnetosonic solitons as a function of space, where FIG. 2A shows plasma density normalized to the background value, FIG. 2B shows the z-component of magnetic perturbation normalized to the background magnetic field, and FIG. 2C shows the x component normalized to the Alfven velocity.

FIGS. 3A and 3B are block schematics illustrating an exemplary setup of orbital debris detector in accordance with one or more aspects of the present disclosure.

DETAILED DESCRIPTION

Figure 1:
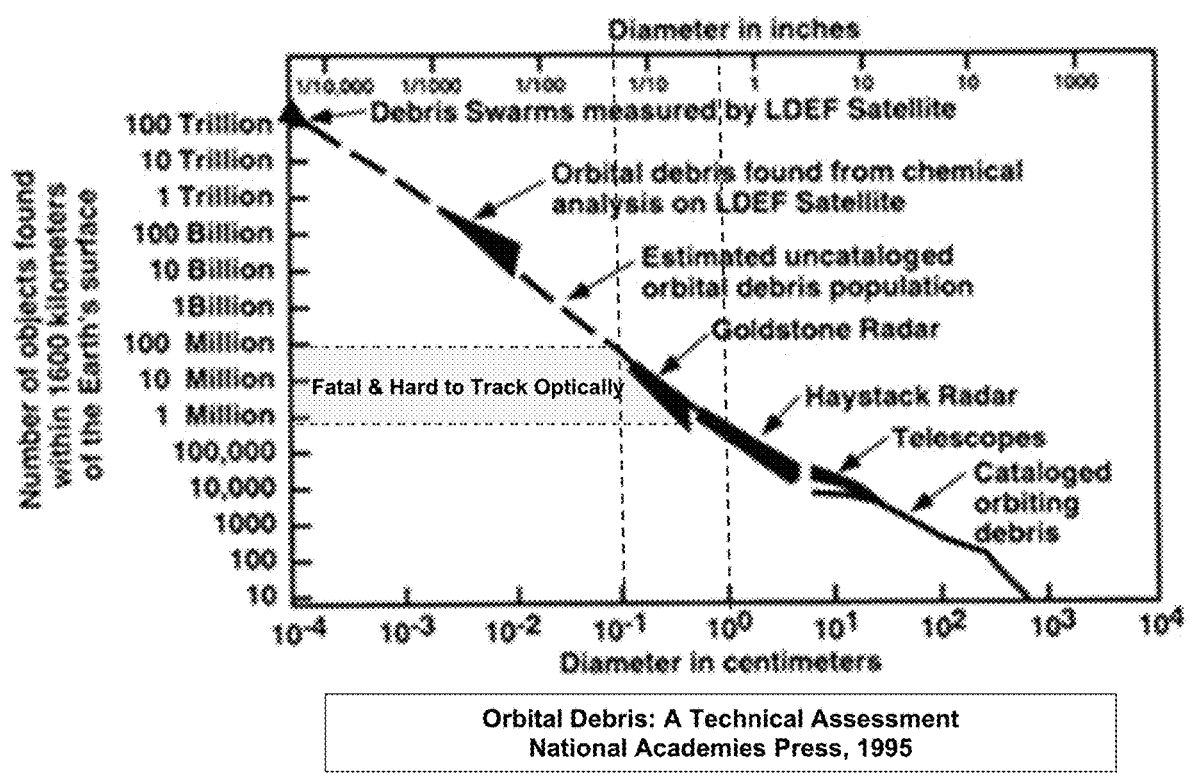
FIG. 1 is a plot illustrating the relative abundance of debris fragments as a function of their dimension published in the year 1995. It emphasizes the large population of smaller sub-cm scale debris. The smaller the scale size, the larger the abundance and hence larger the collision frequency with satellites. Collision with sub-mm scale debris are benign, but NASA has deemed that collision with mm size debris at orbital speeds could be mission ending. While larger than 1 cm debris can be optically detected, it is challenging to do so for the sub-cm scale debris. Collision with these sub-cm class debris are more likely than the larger ones and could be mission ending.

The aspects and features of the present invention summarized above can be embodied in various forms. The following description shows, by way of illustration, combinations and configurations in which the aspects and features can be put into practice. It is understood that the described aspects, features, and/or embodiments are merely examples, and that one skilled in the art may utilize other aspects, features, and/or embodiments or make structural and functional modifications without departing from the scope of the present disclosure.

NRL, in collaboration with the Institute for Plasma Research (IPR—India), has developed two concepts for small debris detection.

A first concept involves exploiting the current generated by charged particle motion. In this approach, the orbital motion of charged debris generates an electrical current, which can be used as a means for in situ surveying. Analysis at NRL suggest that a current pulse transformer based on a conducting wire coil wound around a loop of high permeability material with an amplifier stage to increase measurement sensitivity can act as a detector of charged debris flying through it. Such a loop can be attached to a satellite or placed on other orbiting platforms such as the International Space Station to develop a long-duration survey of the distribution of debris in the LEO region.

The apparatus and method of the present invention provide a means for the direct in situ cataloging of the debris distribution, setting the stage for development of a new remote sensing technique for detection of optically undetectable, sub-centimeter, orbital debris.

An object, such as a piece of debris, that is immersed in a plasma, will acquire a net electrical charge due to the relative difference in mobility between the heavy plasma ions and the much lighter electrons. Photoemission from debris objects exposed to direct sunlight also contributes to the net particle charge. Consequently, charged debris objects moving at supersonic orbital speeds form a current pulse flowing through the background plasma.

The orbital motion of charged debris generates an electrical current, which can be used as a means for in situ surveying. A current pulse transformer (CPT) based on a coil wound around a loop of high permeability material with an amplifier stage to increase measurement sensitivity can act as the detector of charged debris flying through it. By fielding such a detector on a satellite, a long duration survey of the debris distribution in the LEO region as the satellite's altitude is systematically varied.

Since these electrically isolated debris objects will be immersed in LEO plasmas, they will become electrically charged to levels determined by the balance of electron and ion collection, along with the photoemission of electrons. The motion of each debris object through the charged loop creates an electrical current which can be used to detect small, optically untrackable objects moving in orbit so that satellite orbit determination can be made in advance in order to avoid collision with an orbital debris. Also, the map of debris distribution as a function of altitudes generated by the CPT survey can be used as the benchmark to test and develop detectors based on remote sensing methods, such as ground or space-based radars.

By accumulating these measurements over time, the apparatus and method of the present invention can enable the development of statistics on debris distribution at LEO altitudes. In addition, by moving the platform on which the detector is situated in altitude, further three-dimensional information regarding the distribution of debris can be developed.

The method for detecting and mapping debris in low earth orbit in accordance with the present invention utilizes a current pulse transformer based on a coil wound around a high permeability magnetic nanoparticle (MNP) material with an amplifier stage to increase measurement sensitivity.

Figure 3A:
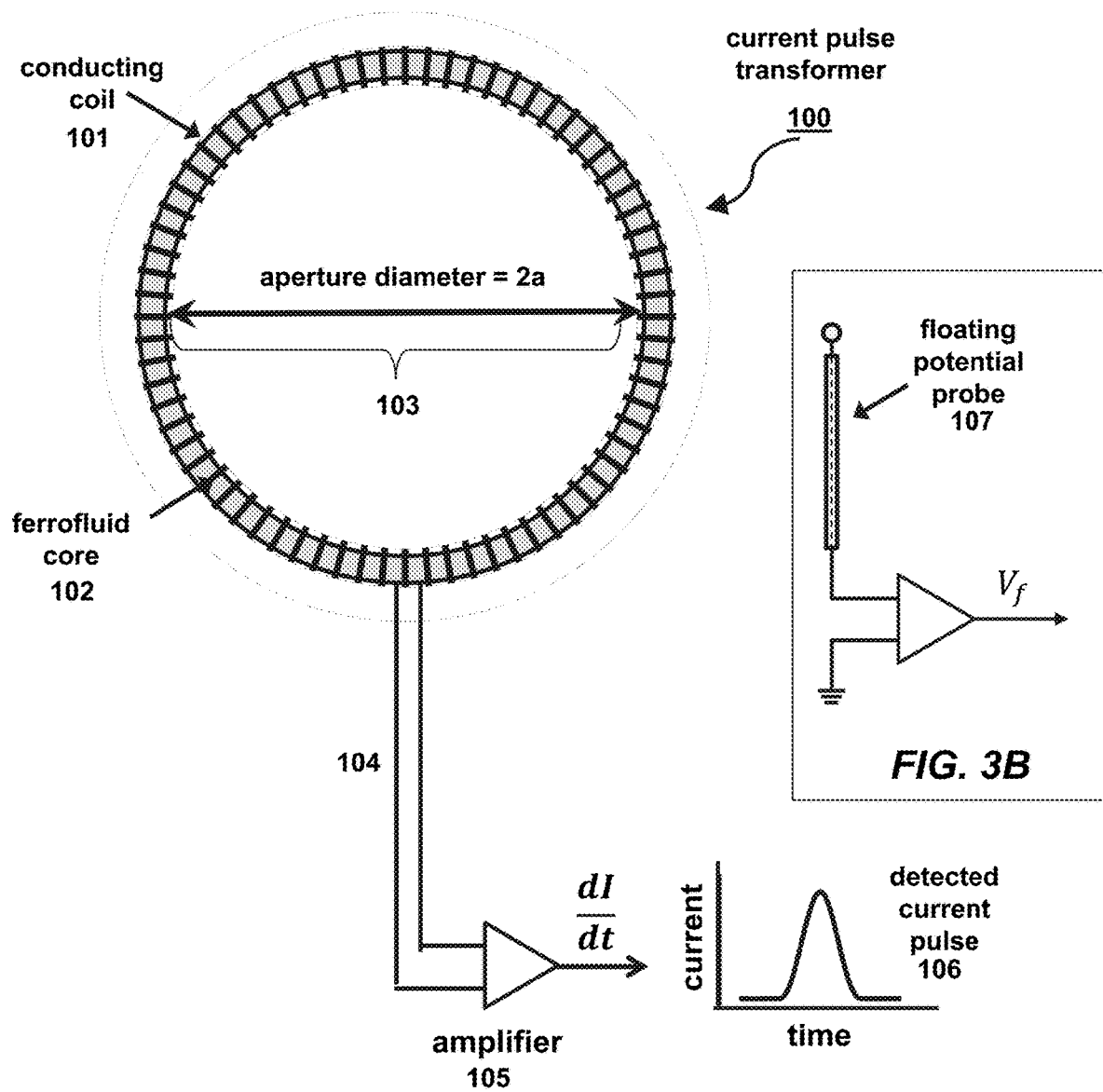

The block schematics in FIGS. 3A and 3B illustrate aspects of an exemplary embodiment of a space debris detector in accordance with the present invention.

As illustrated in FIG. 3A, a space debris detector in accordance with the present invention is based on a current pulse transformer 100 comprising a conducting coil 101 wrapped around an MNP toroidal core 102 having an aperture 103 of radius a. While larger area coils will increase the frequency of detections on orbit, the size of the coil will be determined by size and weight constraints imposed by the particular space vehicle carrying the experiment. The charged debris passing through the coil induces a voltage across the leads, which can then be amplified by amplifier 105.

The MNP toroidal core 102 of the detector of the present invention is unique and represents a significant improvement over ring detectors in the prior art. Unlike any other ring detectors known in the prior art, the MNP toroidal core of the detector in accordance with the present invention is formed from ferromagnetic nanoparticles, e.g., nanoparticles of iron or other suitable ferromagnetic material such as cobalt, nickel, samarium, neodymium, and their various alloys, either alone or embedded within one or more other materials in a solid or in a dense semi-solid medium. Use of such an MNP core in a detector in accordance with the present invention gives the core a high permeability which gives the detector a much higher sensitivity than conventional detectors that do not include such an MNP core.

The number of turns in coil 101 determines the coil inductance, with the number of turns being chosen to provide an optimized balance between high sensitivity and fast response time.

As noted above, when immersed in a plasma like that present in the LEO environment, debris objects become electrically charged due to their interaction with the plasma. To measure the local floating potential of the plasma, which is the voltage to which the orbital debris object will charge, as illustrated by the block schematic in FIG. 3B, an orbital debris detector apparatus in accordance with the present invention includes a floating potential probe 107 such as an isolated electrostatic probe situated near the ring detector. In accordance with the present invention, time-resolved, high impedance measurements of the floating potential $V_f$ of the isolated electrostatic probe are made concurrent with the debris detector measurements in order to provide information regarding the charge of the piece of debris passing through the aperture. With knowledge of the potential of the debris object, and the magnitude of the induced current pulse detected by the CPT, the amount of charge accumulated on the debris can be estimated. Since the total charge on a debris object is proportional to its surface area, an estimate of the equivalent radius of the debris object can be made from the charge that accumulates thereon.

When such an electrically charged piece of debris passes through the aperture 103, its movement generates a current having a magnetic field associated therewith. This magnetic field passing through the coil aperture induces a voltage spike, which provides an indication that a particle, e.g., the piece of debris, has moved through the aperture, i.e., has been detected.

The coil leads 103 are fed into a high-impedance difference amplifier 104, which outputs a detected current pulse 106 which is proportional to the time rate of change of current $dI/dt$ passing through the aperture.

The amplitude of this voltage spike is proportional to the current induced by the particle moving through the ring, which depends on the magnitude of the charge of the particle and its velocity.

The magnitude of the charge is in turn proportional to the size of the debris object, Thus, by including an electrostatic probe to measure the local floating potential of the plasma, $V_f$, the size of the debris object can be estimated from the magnitude of the charge.

To first order, the debris can be modeled as a spherical object with corresponding capacitance $C=4\pi\varepsilon r$, where c is the dielectric constant of the plasma and r is the effective radius of the debris. Consequently, the rough size of the detected debris object will be given by $r=Q/(4\pi\varepsilon V_f)$, where Q is the charge on the object and $V_f$ is its velocity through the ring.

Charged objects penetrating the loop aperture are detected as an induced voltage pulse. The amplitude of the voltage pulse will depend upon the magnitude of the charge on the object and the relative speed between the object and the spacecraft. Laboratory calibration will establish the relationship between the amplitude of the voltage pulse and the magnitude of the current penetrating the detector aperture.

The magnitude of the charge is in turn proportional to the size of the debris object, and thus, the amplitude of the voltage spike also indicates the size of the piece of debris that has passed through the detector. By accumulating such measurements over many orbits and a variety of altitudes during a long-duration mission, a 3-D statistical picture of the distribution of orbital debris sizes can be made.

In addition, the detector will have an effective interaction distance with respect to the charged debris object. Consequently, as the debris object approaches (and recedes from) the midplane of the coil, the magnitude of the induced voltage will vary. Laboratory calibration will establish the characteristic interaction distance, which will vary roughly as the radius of the coil. The half-width of the induced voltage pulse can then be used to determine the debris velocity relative to the spacecraft. In turn, this information can be used to determine the magnitude of the charge, Q, on the debris object from the measured current amplitude.

Experiment

Figure 4A:
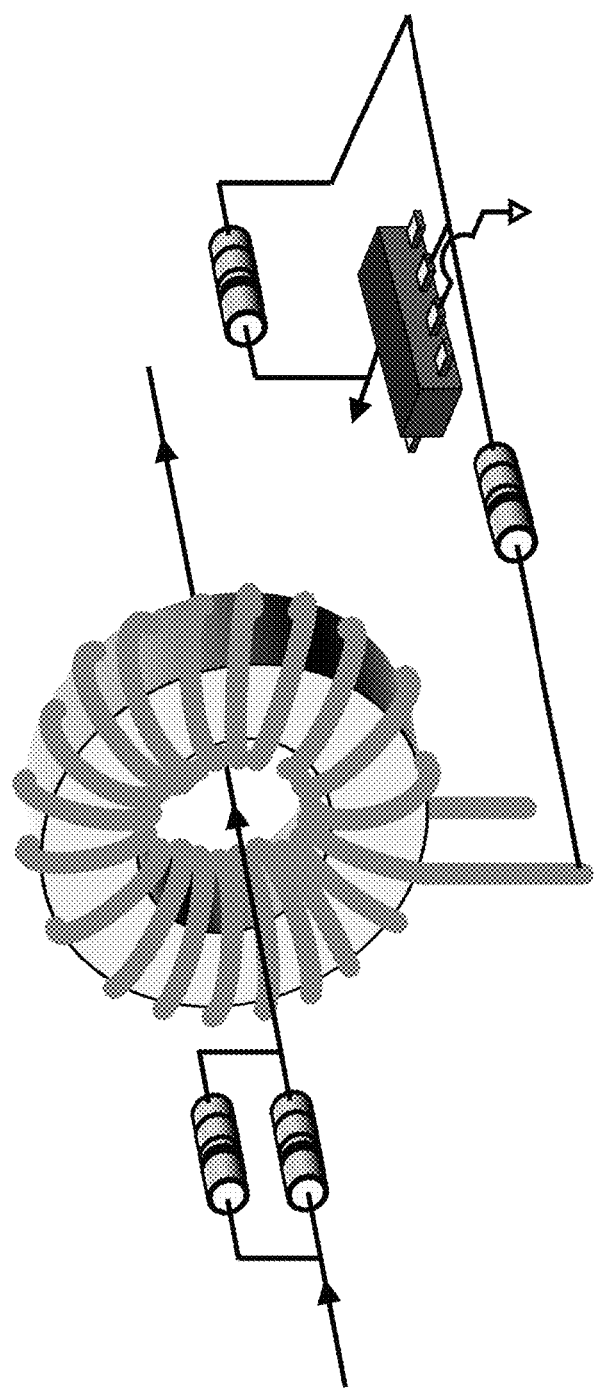
FIGS. 4A-4B illustrate aspects of a simulated orbital debris detector in accordance with the present invention, with FIG. 4A showing test setup used to simulate the operation of an orbital debris detector in accordance with the present invention, and the plot in FIG. 4B showing the results of simulated debris detection through the test setup.

To demonstrate the utility of the detector apparatus in accordance with the present invention, the small-scale model of a ferrite-core magnetic loop shown in FIG. 4A was constructed by the inventors for bench testing the inventive concepts using controlled current pulses passing through the coil. The calculated charge on an exemplary object having a 2-cm diameter under the conditions shown below was used to estimate the transient current produced from such motion:

Estimation of Transient Current From A 2-Cm Diameter Orbital Debris Object

Capacitance of debris: $C=4\pi\varepsilon_0 a \sim 1$ pF
Floating potential: $V_f \sim 10$V
\# of charges on debris object: $Q/e=CV_f/e \sim 10^8$ electrons
Detector diameter: 1 meter
Detector range of sensitivity: ~2 coil diameters (~2 m)
Orbital debris velocity: ~8,000 m/s
Interaction time with coil: $\Delta t \sim 2$ m/8000 m/s~250 µs
Estimated current $I \sim 10^8$ (1.6 e-19 C)/0.00025 s Based on these parameters, the current generated by the debris object passing through the loop was estimated to be ~0.1 µA.

Figure 4B:
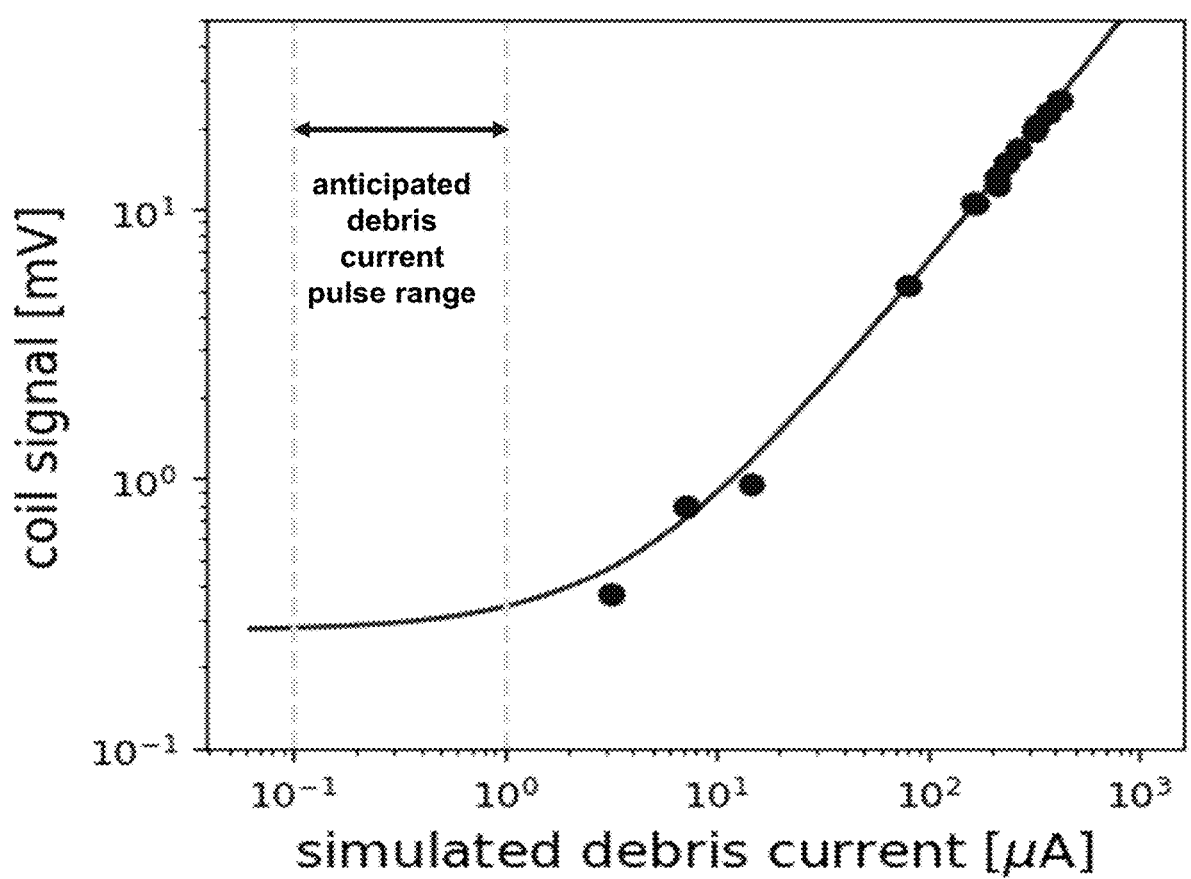

A plot of the induced voltage pulse amplitude measured using the test CPT as a function of the transient current amplitude is shown in FIG. 4B. The test coil used a ferrite core and was not optimized for the number of turns and did not use an amplifier stage. Despite not being optimized, currents on the order of those predicted for the example debris object were measured.

Figure 5:
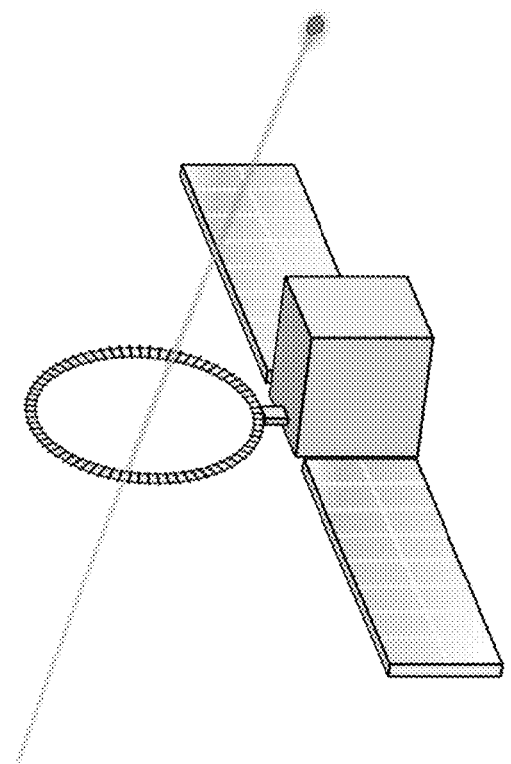
FIG. 5 illustrates an exemplary orbital debris detector in accordance with the present invention implemented on a satellite in low earth orbit.

An exemplary anticipated configuration for space flight is depicted in FIG. 5. In such a configuration, the detector is mounted on a stand-alone satellite situated in low-earth orbit.

The coil dimensions in any such implantations will be determined by the size constraints imposed by a particular space flight opportunity. The debris detector and floating potential probe are inherently low-power instruments.

In order to determine the variation in the distribution of debris with orbital altitude, the instrument is designed to be operated from a satellite initially launched into a high-altitude orbit, which then slowly decays. As the satellite slowly moves toward lower altitudes, data is accumulated along the way, building up the debris distribution information. The decay time is sufficiently slow that the dwell time in each altitude range provides long duration exposure and ample time to build up adequate statistics.

However, it is anticipated that such a debris detection apparatus may also be mounted on other orbiting vehicles such as the International Space Station to obtain the most comprehensive information regarding the size, shape, velocity, and distribution of orbital debris in space and to enable mission planners to avoid such debris.

A second concept for detecting, characterizing, and mapping orbital debris involves exploiting the interaction of a plasma with the charged debris. In this approach, a speeding charged particle moving through a plasma generates non-linear electrostatic ion acoustic solitons that are either pinned to the debris or radiate from it, creating plasma density irregularities. Although the microprojectile is not optically trackable, the density irregularity due to its interaction with the plasma could be detected and exploited for early warning of approaching debris. New analysis indicates the possibility of more promising electromagnetic solitons that are longer lasting, larger in scale size, and propagate faster than the electrostatic solitons. These properties make electromagnetic solitons a superior means for detection and early warning capability.

Added advantages of such an electromagnetic soliton-based approach to orbital debris removal include that it is longer lasting, larger in scale size, and can travel at speeds faster than the ion acoustic speed that is characteristic of electrostatic solitons. These properties make the magnetosonic soliton a superior means for easier detection and earlier warning than an ion acoustic soliton, which could be crucial for successful collision avoidance.

Advantages and New Features

The main advantages offered by this method of debris detection are simplicity of design and high reliability. Previous debris detectors used in space flight operated by detection of changes in signal produced when fine wires that are strung as a part of an array are severed by the impact with debris. Other debris detectors use aerogel to follow the particle track, but they are also limited in their application time. The method described here has the advantage of using non-destructive detection, which makes it ideal for long-duration statistical survey of orbital debris distribution.

A new feature of the current pulse detector loop described here is the use of a high-permeability MNP core to improve detection sensitivity. Together, these features of the detector enable it to be used reliably for long-duration operation in harsh space environments with minimal power requirements.

To survey the debris distribution in altitude and azimuth, satellite-mounted loops will be deployed at the upper altitude limit. After maintaining the satellite at this altitude for sufficiently long duration (based on orbital and precision periods) to capture a statistically significant view of the debris, the altitude will be lowered until the bottom limit of the targeted altitude range for survey. A similar procedure can be repeated for different orbital inclinations.

Alternatives

The prototype device described above and shown in FIG. 3 represents one exemplary embodiment of such a device. However, other operational configurations are possible. For example, the use of a pair of detector coils operating at known separation could improve upon the debris velocity measurement by enabling the delay time between current pulses to be measured. This configuration would also have the benefit of reducing any potential false positives since a valid signal would have to be detected from both coils.

In general, the use of larger area coil aperture will reduce the dwell time necessary to accumulate an adequate statistical sample at a given orbital altitude. This must be weighed against the size and weight constraints of the satellite from which the sensor would be deployed.

Thus, as described herein, the present invention provides an apparatus that can detect and characterize small, optically undetectable sub-cm debris objects in low-earth orbit using a ring detector having an MNP toroidal core formed from magnetic nanoparticles, which gives the detector a much higher sensitivity than conventional detectors that do not include such an MNP core. The orbital debris detector in accordance with the present invention will permit mission scientists and engineers to set the orbit of satellites or other orbital objects so as to avoid collision with orbital debris.

Although particular embodiments, aspects, and features have been described and illustrated, one skilled in the art would readily appreciate that the invention described herein is not limited to only those embodiments, aspects, and features but also contemplates any and all modifications and alternative embodiments that are within the spirit and scope of the underlying invention described and claimed herein. The present application contemplates any and all modifications within the spirit and scope of the underlying invention described and claimed herein, and all such modifications and alternative embodiments are deemed to be within the scope and spirit of the present disclosure.

What is claimed is:

1. An orbital debris detector, comprising:
a high-permeability toroidal core formed from a magnetic nanoparticle material;
a conducting coil wrapped around the toroidal core in a predetermined plurality and distribution of loops with the conducting coil leads being connected to an amplifier stage;
a processor that receives an electrical signal from the amplifier indicative of an induced current pulse generated when a charged debris object travels through a plasma surrounding the detector and through the toroidal core, the current pulse being indicative of a presence of a charged debris object traveling through the core; and
a floating voltage probe coupled to the processor, the floating voltage probe providing a signal indicative or a floating potential $V_f$ of a plasma surrounding the detector.

2. The orbital debris detector according to claim 1, wherein the magnetic nanoparticle material comprises nanoparticles of iron or other suitable ferromagnetic material such as cobalt, nickel, samarium, neodymium, and their various alloys, either alone or embedded within one or more other materials in a solid or in a dense semi-solid medium.

3. The orbital debris detector according to claim 1, further comprising a processor that receives data of the induced current pulse and outputs data indicative of a size of a debris object passing through the toroidal core.

4. The orbital debris detector according to claim 1, further comprising a processor that receives data of a plurality of induced current pulses and outputs data indicative of a spatial and/or temporal distribution of debris objects passing through the toroidal core.

* * * * *